United States Patent [19]
Johnston

[11] Patent Number: 6,029,875
[45] Date of Patent: Feb. 29, 2000

[54] BICYCLE MOUNTED KNAPSACK

[76] Inventor: Patrick Johnston, 420 St. Louis Avenue, Dorval, Quebec, Canada, H9S 2S6

[21] Appl. No.: 08/874,715

[22] Filed: Jun. 13, 1997

[51] Int. Cl.[7] .................................. B62J 9/00; A45F 3/04
[52] U.S. Cl. .......................... 224/417; 224/153; 224/584; 224/630; 224/460
[58] Field of Search ..................................... 224/412, 416, 224/417, 419, 428–439, 451, 452, 463, 153, 575–577, 584, 585, 627–630, 620, 901, 901.2, 901.4

[56] References Cited

U.S. PATENT DOCUMENTS

| | | |
|---|---|---|
| 3,080,100 | 3/1963 | Glenny ..................................... 224/434 |
| 3,184,128 | 5/1965 | Bucher . |
| 3,786,972 | 1/1974 | Alley . |
| 3,938,716 | 2/1976 | Jackson et al. . |
| 3,955,729 | 5/1976 | Montgomery ........................... 224/438 |
| 4,059,207 | 11/1977 | Jackson et al. . |
| 4,066,195 | 1/1978 | Dickler . |
| 4,085,873 | 4/1978 | Schweitzer . |
| 4,236,657 | 12/1980 | Brunton ................................. 224/153 |
| 4,261,491 | 4/1981 | Schroeder ............................... 224/439 |
| 4,271,996 | 6/1981 | Montgomery ........................... 224/452 |
| 4,301,952 | 11/1981 | McNeill . |
| 4,433,802 | 2/1984 | Woolf . |
| 4,450,988 | 5/1984 | Meisel . |
| 4,491,258 | 1/1985 | Jones . |
| 4,580,706 | 4/1986 | Jackson et al. . |
| 4,609,084 | 9/1986 | Thomas . |
| 4,629,040 | 12/1986 | Jones ..................................... 224/435 |
| 4,798,318 | 1/1989 | Irwin ...................................... 224/431 |
| 4,830,245 | 5/1989 | Arakaki . |
| 4,921,151 | 5/1990 | Duvall .................................... 224/438 |
| 4,934,573 | 6/1990 | Jaeger . |
| 5,119,910 | 6/1992 | Heggeland ............................. 224/620 |

FOREIGN PATENT DOCUMENTS

| | | | |
|---|---|---|---|
| 989044 | 9/1951 | France ................................. 224/32 A |
| 3107292 | 9/1982 | Germany ............................. 224/30 R |
| 104694 | 6/1942 | Sweden ............................... 224/30 R |
| 646120 | 11/1950 | United Kingdom ................. 224/32 R |

OTHER PUBLICATIONS

"Road Bike Action" Magazine—Aug. 1993—Trek Convertible Pack.

*Primary Examiner*—Gregory M. Vdovich
*Attorney, Agent, or Firm*—Swabey Ogilvy Renault

[57] ABSTRACT

The knapsack has a bottom wall resting against a user's back when supported by shoulder straps. The bottom wall is larger than a bicycle luggage carrier or rack. The knapsack has a frame structure for reinforcing the bottom wall and the side wall of the knapsack so that when the knapsack is placed with the bottom wall horizontally on top of the carrier, loose articles in the knapsack do not cause the bottom wall of the knapsack to sag over the sides of the carrier. The shoulder straps are attached to the bottom wall or sandwiched between the bottom wall and the carrier to prevent the shoulder straps from dangling down and possibly interfering with movement of the bicycle wheels. The knapsack has fastening straps for securing the knapsack to the luggage carrier. In one embodiment, the frame structure is a removable insert for a conventional knapsack.

16 Claims, 3 Drawing Sheets

BICYCLE MOUNTED KNAPSACK

TECHNICAL FIELD OF THE INVENTION

The present invention relates to the field of bags suitable for carrying small articles and is primarily concerned with bags which are adapted for use either as a knapsack or as a pannier on a bicycle. In this specification, a "pannier" is used to refer to a bag mounted to a bicycle for carrying articles.

BACKGROUND OF THE INVENTION

Many bicycle riders may frequently wish to use a bag alternatively as a pannier or as a knapsack. For example, touring cyclists may wish to carry the pannier as a knapsack while hiking in areas that are accessible only on foot or while simply taking a stroll off the bicycle. Also, students who ride a bicycle to and from school may wish to use a bag as a pannier while riding, and then as a knapsack while at school.

The prior art includes many bag constructions which are adapted for attachment to a bicycle.

One such bag is described in U.S. Pat. No. 3,938,716. This patent describes a bag which can be carried on a user's back using shoulder straps, or which alternatively can be secured to a side of a bicycle luggage carrier. A principal disadvantage of this design is that the bag is secured to the bicycle vertically on one side or the other of one of the wheels, thus displacing the center gravity of the bicycle. This can present difficulty to the rider of the bicycle and could lead to an accident. Furthermore, such "saddle bags" increase the aerodynamic drag of the bicycle, and access to the contents of the bag from the top of the bag while it is still attached to the side of the carrier is difficult since the contents are piled up inside the bag.

Another type of backpack for attachment to a bicycle is described in U.S. Pat. No. 4,491,258. This bag includes a main storage element having three compartments. When secured to a luggage carrier on a bicycle, the three compartments form two saddle bags, which hang vertically on either side of the wheel, and a central compartment which sits on top of the luggage carrier. The central compartment is illustrated as a small cylindrical bag resting on top of the luggage carrier. While this bag does not create an imbalance on the bicycle to which it is secured, it still has the disadvantages of increasing the aerodynamic drag and making access to the contents of the compartments difficult while the bag is supported on the bicycle. Furthermore, a principal disadvantage is that it requires a back-pack having three compartments. Therefore, this back-pack is relatively complicated to manufacture and involves a complicated series of steps to be secured to a bicycle. In addition, the contents of the back pack must be divided up between the three smaller compartments. Another disadvantage of this design is that it requires that the shoulder strap assembly be removed in order to secure it to a luggage carrier.

Yet another bag is described in U.S. Pat. No. 4,059,207. It describes a bag adapted for attachment to the substantially horizontal surface of a motorcycle gas tank. While this bag provides a single compartment and does not create an imbalance, it does have other disadvantages. It requires that a pad be installed between the gas tank and the bag in order to support the bag evenly and horizontally on the gas tank. This bag is only appropriate for motorcycles having large support surfaces, such as gas tanks. As with the design referred to in the previous example, the support surface underneath the bag, in this case the pad, is the same size as the bottom of the bag and the bag is a conventional construction bag.

There is a need for a bicycle mounted knapsack which provides a convenient single compartment easily accessible while mounted to the bicycle and is easily attached to a luggage carrier centrally on the bicycle in a way that does not significantly increase aerodynamic drag.

SUMMARY OF THE INVENTION

According to a broad aspect of the invention, there is provided a bag for use either as a knapsack or a pannier which is adapted to be placed horizontally on an existing conventional bicycle luggage carrier. The bottom of the knapsack has dimensions extending beyond the luggage carrier while the knapsack is reinforced such that loose contents of the bag will not be allowed sag below the horizontal surface of the luggage carrier.

In accordance with an aspect of the invention there is provided a knapsack adapted for carriage on a luggage carrier of a bicycle, the knapsack comprising a bag enclosure having a bottom wall and a side wall, the bottom wall being adapted to be placed in substantially horizontal contact with the luggage carrier when carried on a bicycle and having dimensions extending beyond the sides of the luggage carrier, the bottom wall also being adapted to be placed in substantially vertical contact with a user's back when carried by a user, a frame means for preventing loose articles in the bag enclosure from sagging below the luggage carrier when the knapsack is carried thereon, the frame means comprising a frame bottom adapted to be secured adjacent the bottom wall and a frame side adapted to maintain the side wall in a position to prevent the loose articles in the bag enclosure from sagging below the luggage carrier, and fastening means for securing the knapsack to the luggage carrier.

In accordance with another aspect of the invention there is provided a method of transporting a knapsack on a luggage carrier of a bicycle, comprising the steps of providing a bottom and a side of the knapsack with reinforcement such that, when the bottom of the knapsack is oriented substantially horizontally, and supported from below on a support surface smaller than the bottom, loose articles in the knapsack are contained therein and prevented from sagging below the support surface, placing the knapsack such that the reinforced bottom is in substantially horizontal contact with the luggage carrier; and securing the knapsack to the luggage carrier.

In accordance with still another aspect of the invention there is provided a frame insert for a knapsack for preventing loose articles in the knapsack from sagging below a support surface supporting from below a bottom wall of the knapsack, the frame insert including fastening means for securing the knapsack to a luggage carrier on a bicycle.

An advantage of the present invention is that the knapsack functions efficiently as a pannier when secured to a luggage carrier on a bicycle and as a knapsack when carried on a user's back.

Another advantage of the present invention is that the knapsack is adapted for attachment to the horizontal surface of a conventional bicycle luggage carrier fixed over either the front or rear wheel of a bicycle. This allows the knapsack to be centered on the bicycle in order to minimize disturbance to the balance of the bicycle and limit the contribution to aerodynamic drag caused by the pannier. By mounting the knapsack horizontally-on the bicycle, the contents of the knapsack can be efficiently accessed while the knapsack is secured to the bicycle luggage carrier.

Another advantage of the present invention is that the knapsack is easily secured or unsecured from the luggage carrier.

Another advantage of the present invention is that the knapsack conforms to conventional forms of manufacturing and is of simple construction so as to be inexpensive to manufacture and relatively trouble-free in operation.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

Figure 4:
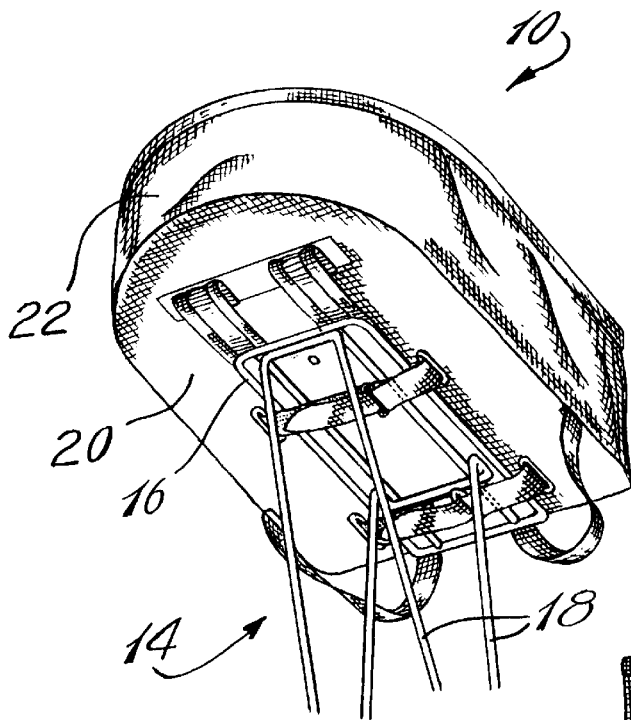
FIG. 4 is a perspective view showing the bottom of the convertible knapsack pannier of FIG. 1 mounted as a pannier on a conventional bicycle luggage carrier.
Figure 5:
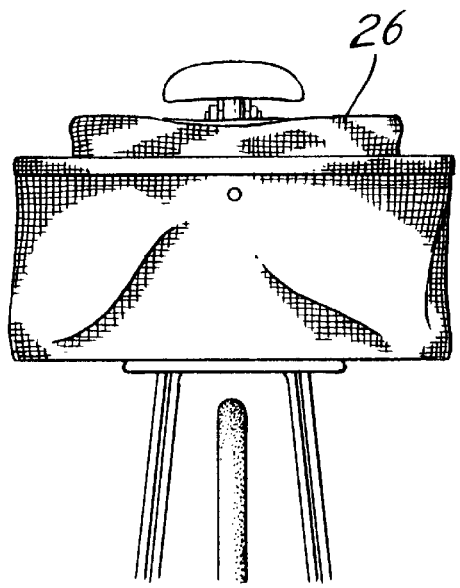
FIG. 5 is a rear view of the convertible knapsack pannier of FIG. 1 mounted as a pannier on a conventional bicycle luggage carrier.

Referring to FIG. 4, there is shown a convertible knapsack pannier or knapsack 10, adaptable for use either as a knapsack or a pannier, in accordance with an embodiment of the present invention.

The knapsack 10 is shown mounted on a conventional bicycle luggage carrier 14. The luggage carrier includes a horizontal platform 16 which is supported over either the front or rear wheel of the bicycle by braces 18 extending down opposite sides of the wheel from the platform 16 to the bicycle frame.

Figures 1, 2, 3:
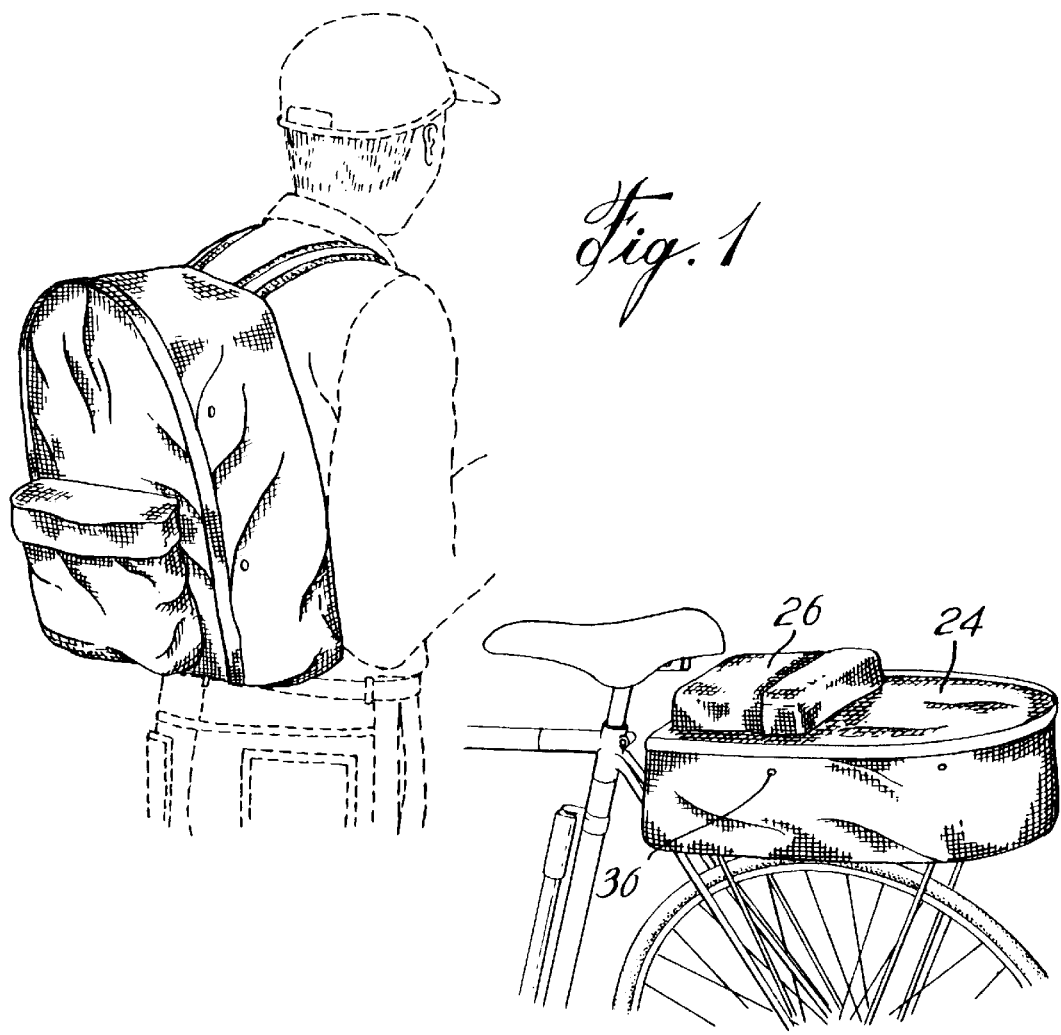
FIG. 1 is a perspective view showing a convertible knapsack pannier in accordance with the preferred embodiment of the present invention mounted as a knapsack on the back of a user.
FIG. 2 is a perspective view showing the convertible knapsack pannier of FIG. 1 mounted as a pannier on a conventional bicycle luggage carrier, the pannier shown in its closed configuration.
FIG. 3 is a perspective view showing the convertible knapsack pannier of FIG. 1 mounted as a pannier on a conventional bicycle luggage carrier, the pannier shown in its open configuration.

The knapsack 10 typically includes a bottom wall 20, a side wall 22 and a top wall 24. As shown in FIGS. 2 and 3, the top wall 24 is preferably attached to a section of the side wall 22 and releasably fastened to the remainder of the edge of the side wall 22 so as to allow the top wall 24 to be used in an open configuration, as shown in FIG. 3, or in a closed configuration, as shown in FIG. 2. Typically, a pouch 26 is attached to the outer surface of the top wall 24 as is well known in the art.

Figure 9:
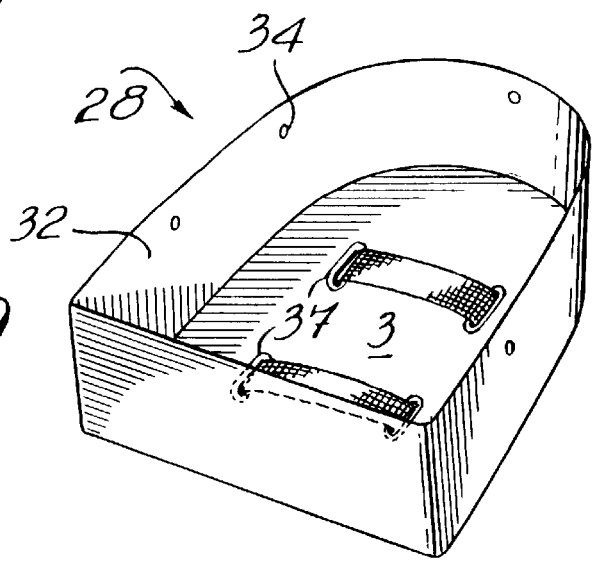
FIG. 9 is a perspective view showing the inner frame structure of the convertible knapsack pannier in accordance with an embodiment of the present invention.

An internal rigid frame structure 28 is adapted to be mounted inside the knapsack 10. The frame structure 28 is preferably constructed of DuraFlex™ polyethylene solid sheet material having a thickness of 0.055" (1.4 mm). Alternatively, it has been found that extruded corrugated plastic sheet material, such as the sheet material commonly referred to as "sign board" is functional. As shown in FIG. 9, the frame structure 28 in the preferred embodiment includes a frame bottom 30 and a frame side 32. The side 32 is preferably made of the same DuraFlex™ material, however, the preferred thickness is 0.035" (0.9 mm). Preferably, the frame bottom 30 fits snugly into the bag enclosure adjacent the bottom wall 20 so that the frame side 32 is supported by the frame bottom 30 when the knapsack is in a horizontal position.

The frame structure 28 is provided with releasable fastening means such as snaps 34 adapted to cooperate with matching snaps 36 provided in the side wall 22 of the knapsack 10 in order to releasably secure the frame structure 28 inside the knapsack 10. Snaps may be similarly provided to fasten the frame bottom panel 30 to the bottom wall 20. In an alternative embodiment of the invention, the frame structure 28 could be permanently installed using sewing lines, an adhesive material, hook and loop fasteners or any other suitable means. The frame structure 28 could also be held in place simply by the bag enclosure. That is, the frame side 32 could be held in place on one edge by the frame bottom 30 and on the other edge by the top wall 24. The frame bottom 30 could be held in place on one side by the bottom wall 20 and on the other side by the frame side 32.

Bottom wall 20 and the frame bottom 30 are each provided with slots 37 extending therethrough. The slots 37 are configured so as to slideably receive a corresponding set of fastening straps 38. The fastening straps 38 are each provided with a buckle 40 and releasable fastening means such as a conventional hook and loop fastener 42. As illustrated in FIG. 4, the fastening straps 38 are each adapted to be used for securing the knapsack 10 to the luggage carrier 14. The fastening straps 38 are each adapted to be tightened through the corresponding buckle 40 and releasably fastened using the hook and loop fastener 42.

When the knapsack 10 is secured in this manner to the luggage carrier 14, access to the interior of the knapsack 10 is facilitated since a user need only peel back the top wall 24 of the knapsack 10, as illustrated in FIG. 3.

Figure 6:
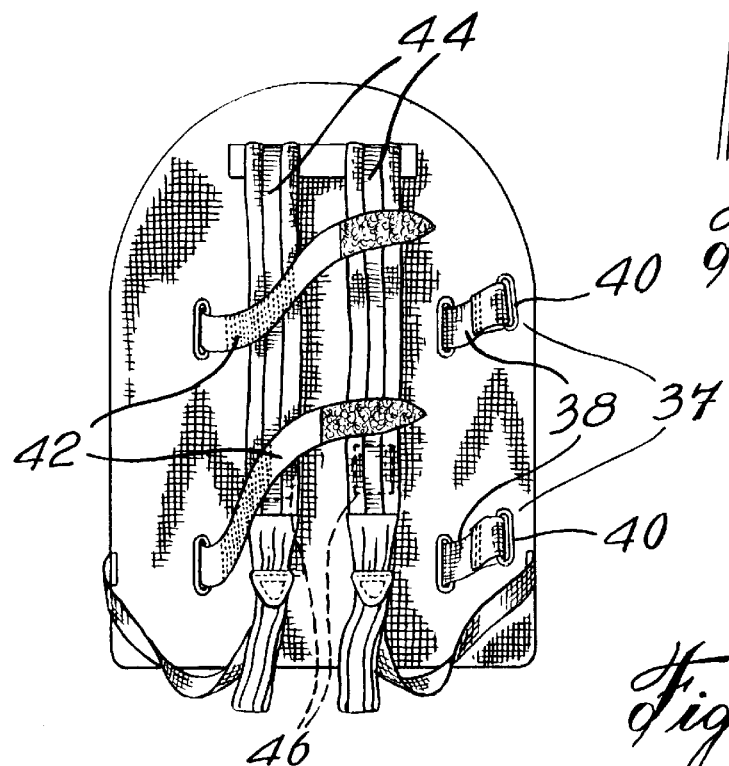
FIG. 6 is a bottom view of the convertible knapsack pannier of FIG. 1 showing its shoulder straps and fastening straps configured so as to be mountable as a pannier on a conventional bicycle luggage carrier.
Figure 8:
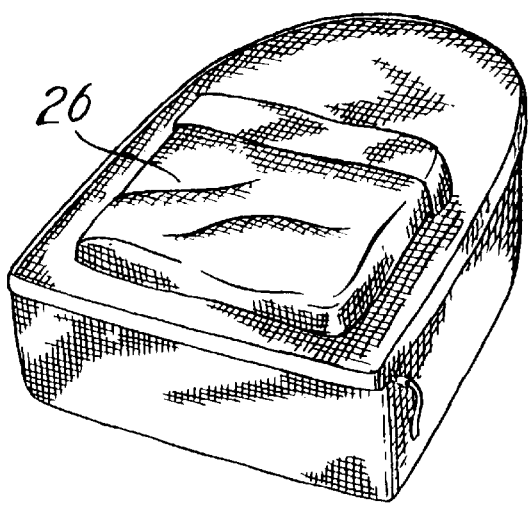
FIG. 8 is a perspective view showing the top of the convertible knapsack pannier of FIG. 1.

The knapsack 10 is also provided with conventional shoulder straps 44 adapted for use when the knapsack 10 is carried on a user's back. The shoulder straps 44 and the bottom wall 20 are each provided with a corresponding portion of a releasable fastening means for fastening each shoulder strap 44 to the bottom wall 20. The fastening means typically takes the form of portions of hook and loop fasteners 46 on the shoulder straps 44 adapted to cooperate with corresponding portions of hook and loop fasteners attached to the bottom wall 20. As illustrated in FIG. 6, when the knapsack 10 is to be mounted on the luggage carrier 14, the shoulder straps 44 are releasably secured stationary against the bottom wall 20 so as to prevent the shoulder straps 44 from interfering with the wheels of the bicycle or other moving parts. It will be noted that the shoulder straps 44 are also secured by being sandwiched between the bottom wall 20 and the carrier 16, as well as by being contained by straps 38.

It should be understood that the configuration of the knapsack 10 could be varied without departing from the scope of the invention. For example, though the frame side 28 shown in FIG. 9 is adapted to be in contact with the whole side wall 22, the frame side 28 could be configured so as to contact less than the whole side wall 22 without departing from the scope of the invention. In addition, the frame side 28 could be made in any configuration which would ensure that loose articles in the knapsack 10 would not be allowed to sag below the luggage carrier 14 when the knapsack 10 is used as a pannier. Such a configuration could be a wire frame maintained at a certain distance from the frame bottom 30 by a spring. It should also be understood that the fastening means for releasably fastening the shoulder straps 44 could be a fastening strap.

It should also be understood that the configuration of the luggage carrier described herein is exemplary only and that the knapsack 10 could be used with other types of bicycle luggage carriers without departing from the scope of the present invention.

The following sets out the method of transporting a knapsack on a luggage carrier of a bicycle according to the preferred embodiment. The knapsack 10 is opened and the pre-cut frame bottom 30 is placed against the bottom wall. The side frame 32 is preferably a strip which is arcuately bent around the curved part of the side wall and has ends facing one another at the base side wall. This side frame strip is bent to be smaller than the opening of the bag 10 and then inserted into the bag 10 where the side frame is expanded to press against the side wall 22 of the bag. The side frame strip 32 rests on top of the bottom frame 30 so that weight on the side frame is supported by the bottom frame. The slots 37 are aligned with one another and the straps 38 are passed through the slots to make the bag 10 ready for attachment to the carrier 16 by tightening the straps around the carrier members with the bottom wall 20 resting horizontally on the carrier platform 16. The hook and loop fasteners 46 are used to keep the shoulder straps 44 secured against the bottom 20 while the knapsack is being placed on the carrier 16. The straps 38 are then fastened and the straps 44 are contained between the carrier and the bottom 20 by the straps 38.

Figure 7:
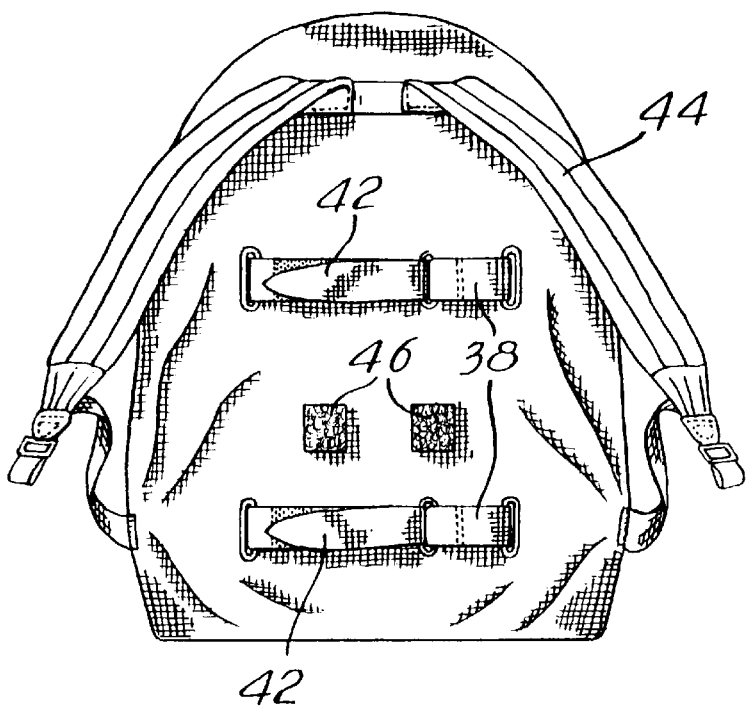
FIG. 7 is a bottom view of the convertible knapsack pannier of FIG. 1 showing its shoulder straps and fastening straps configured for use as a knapsack.

As shown in FIG. 7, the loosened carrier fastening straps 38 are fastened to one another and rest flat against the bottom wall. The user can barely notice the presence of the fastening straps when wearing the knapsack.

It is to be understood that the above detail description is provided for the purposes of teaching the present invention and not for limiting the scope of the invention as defined in the appended claims.

I claim:

1. A knapsack in combination with a bicycle luggage carrier configured for attachment to a bicycle and having a substantially flat, rectangular, horizontal object-carrying surface located over a wheel of the bicycle, said object-carrying surface having a width, said knapsack comprising:
   a bag enclosure having a bottom wall and a side wall, said bottom wall being adapted to be placed in substantially horizontal contact with said luggage carrier when carried on the bicycle, said bottom wall also being adapted to be placed in substantially vertical contact with a user's back when carried by a user, said bottom wall having a width extending beyond said width of said object-carrying surface,
   at least one shoulder strap having two ends secured to said bag enclosure and a length, said length being sufficient to cause said at least one shoulder strap to form a dangling portion thereof when said knapsack is not worn and placed in a horizontal position,
   a frame comprising a frame bottom panel adapted to be secured adjacent said bottom wall and a frame side adapted to maintain said side wall in a position to prevent loose articles in said bag enclosure from sagging below said object-carrying surface when said knapsack is carried thereon, and
   at least one fastener located on said bottom wall inset from a periphery of said bottom wall releasably securing said bottom wall of said bag enclosure to said object-carrying surface wherein said dangling portion of said at least shoulder strap is positioned between said bottom wall and said object carrying surface wherein said at least one fastener secures said bottom wall to said object carrying surface.

2. The knapsack as defined in claim 1, wherein said fastener is adapted to fasten said frame bottom panel to said luggage carrier.

3. The knapsack as defined in claim 1, wherein said fastener comprises at least one strap, said bottom wall and said frame bottom each include at least one substantially co-located slot for passage of said strap of said fastener for releasably securing said knapsack to said luggage carrier.

4. The knapsack as defined in claim 3, wherein said at least one co-located slot in each of said bottom wall and said frame bottom comprises four slots in each, and two said straps are provided.

5. The knapsack as defined in claim 4, wherein said straps are provided with hook and loop fasteners.

6. The knapsack as defined in claim 1, wherein said frame side is adapted to be secured to said bag enclosure side wall with snaps placed at corresponding points thereon.

7. The knapsack as defined in claim 1, further comprising a fastener releasably securing said at least one shoulder strap to said bag enclosure, whereby said at least one shoulder strap is prevented from becoming entangled in any moving parts of the bicycle.

8. The knapsack as defined in claim 7, wherein said fastener releasably securing said at least one shoulder strap is a hook and loop fastener provided on said at least one shoulder strap and said bottom wall.

9. The knapsack as defined in claim 1, wherein said bag enclosure includes a top wall opposite said bottom wall, which top wall is selectively partially detached from said bag enclosure while said knapsack is fastened to said luggage carrier to access articles in said bag enclosure.

10. The knapsack as defined in claim 1, wherein said frame side comprises a panel supported by said bottom panel.

11. The knapsack as defined in claim 10, wherein said frame side panel has the same height as said bag side wall.

12. The knapsack as defined in claim 11, wherein said frame side panel is a flexible plastic strip which is arcuately bent around a curved part of said bag side wall and has ends facing one another at a base side wall, whereby the side panel frame strip is bent to be smaller than the opening of the bag and then inserted into the bag where the side frame is expanded to press against the side wall of the bag.

13. The knapsack as defined in claim 1, wherein said at least one fastener located on said bottom wall comprises fastening straps wrapping around members of said luggage carrier.

14. A method of transporting a knapsack on a bicycle, comprising the steps of:
   providing a bicycle luggage carrier having a horizontal object-carrying surface located over a wheel of said bicycle:
   providing a bottom and a side of said knapsack with reinforcement such that, when said bottom of said knapsack is oriented substantially horizontally, and supported from below on said object-carrying surface having a width substantially smaller than a width of said bottom, loose articles in said knapsack are contained therein and prevented from sagging below said object-carrying surface, providing said knapsack with at least one shoulder strap having two ends secured to said knapsack and a length, said length being sufficient to cause said at least one shoulder strap to form a dangling portion, placing said knapsack such that said reinforced bottom is in substantially horizontal contact with said object-carrying surface and said dangling portion is located between the reinforced bottom and said object-carrying surface, and securing said reinforced bottom of said knapsack to said object-carrying surface from at least one anchor point on said reinforced bottom which is inset from a periphery of said reinforced-bottom.

15. The method of transporting a knapsack on a bicycle as defined in claim 14, wherein said knapsack has a pair of shoulder straps, and further comprising a step of releasably securing a point on each of said shoulder straps to said knapsack, whereby each said shoulder strap is prevented from becoming entangled in any moving parts of said bicycle.

16. The method of transporting a knapsack on a bicycle as defined in claim 14, wherein said knapsack has a pair of shoulder straps, and further comprising a step of placing said shoulder straps between said reinforced bottom and said object-carrying surface prior to said step of securing said bottom to said object-carrying surface to secure said shoulder straps therebetween, whereby each said shoulder strap is prevented from becoming entangled in any moving parts of said bicycle.

\* \* \* \* \*